United States Patent [19]

McCaffrey

[11] 4,143,800

[45] Mar. 13, 1979

[54] LITTER BOX

[75] Inventor: James A. McCaffrey, Norcross, Ga.

[73] Assignee: Diversified Plastics Products Inc., Norcross, Ga.

[21] Appl. No.: 885,314

[22] Filed: Mar. 10, 1978

[51] Int. Cl.² .................................................. B60R 11/00
[52] U.S. Cl. ............................ 224/42.42 R; 224/42.11
[58] Field of Search ............... 224/42.42 R, 42.45 R, 224/29 R, 42.11; 248/346; 16/180, 181, DIG. 13

[56] References Cited

U.S. PATENT DOCUMENTS

| | | | |
|---|---|---|---|
| 2,988,206 | 6/1961 | Olson | 224/42.42 R UX |
| 3,315,798 | 4/1967 | Mathison | 224/42.42 R |
| 3,561,589 | 2/1971 | Larkin et al. | 224/29 R |
| 4,055,286 | 10/1977 | Schmid | 224/42.42 R |
| 4,061,258 | 12/1977 | Dysart | 224/42.42 R |

Primary Examiner—Trygve M. Blix
Assistant Examiner—Jerold M. Forsberg
Attorney, Agent, or Firm—Webb, Burden, Robinson & Webb

[57] ABSTRACT

An automobile litter box includes an enclosed volume open at one end which provides a receptacle with a base which is curved and adapted to rest on the outer periphery of an automobile transmission and driveshaft tunnel. A pair of arcuate arms are rotatably mounted at opposing ends of the base and adapted to engage the outer periphery of an automobile transmission and driveshaft tunnel. Means are provided for applying spring-like compressive force to at least one of the arms thereby providing frictional compressive engagement of the arms with the outer periphery of the tunnel.

3 Claims, 8 Drawing Figures

LITTER BOX

BACKGROUND OF THE INVENTION

1. Field of the Invention

This invention relates to automobile litter boxes and more particularly to automobile litter boxes for mounting on the outer periphery of a transmission and driveshaft tunnel.

2. Description of the Prior Art

Automobile litter boxes are a popular item for use as receptacles. When first introduced the contemplated purpose of the litter box was to provide a receptacle for trash refuse and the like to maintain the interior of a car in aesthetically pleasing condition. With the advent of tape recorders, the use of the litter box has extended to that of a storage compartment for audio tape and like items which are to be removed when a vehicle is not being driven. Further, litter boxes have been produced with shelves or appropriate indentations to hold cups, glasses and the like. Thus, the term "litter box" as used herein relates to a receptacle for storage of a wide variety of small articles and is not restricted to a receptacle for trash.

Generally the litter box is comprised of an enclosed volume, open at one end, which provides the receptacle. The base of the litter box is designed to matingly rest on the outer periphery of the transmission and driveshaft tunnel and usually has some means of attaching the box to the tunnel so that the contents do not spill during transit. The attaching means have been a variety of apparatus from screws fastened to the tunnel, to flaps containing weights to stabilize the box.

The problems in fastening are that when screws and the like are used, the box is permanently fixed and removal of the box is inconvenient. Other non-permanent methods of mounting have resulted in spillage of the box's contents during transit. Further, complex attaching arrangements are prohibited due to cost of materials and labor costs in assembly.

In accordance with the present invention, a litter box is provided which is economical to manufacture, may be securely fastened to the tunnel and is readily removable.

SUMMARY OF THE INVENTION

An automobile litter box includes an enclosed volume open at one end which provides a receptacle with a base which is curved and adapted to rest on the outer periphery of an automobile transmission and driveshaft tunnel. A pair of arcuate arms are rotatably mounted at opposing ends of the base and adapted to frictionally engage the outer periphery of an automobile transmission and driveshaft tunnel. Means are provided for applying spring-like compressive force to at least one of the arms thereby providing frictional compressive engagement of the arms with the outer periphery of the tunnel.

The litter box may be constructed of a variety of materials such as thermosetting and thermoplastic resins, metal or the like which have the necessary properties to impart the mechanical characteristics as hereinabove described. Preferably, the material of construction is thermoplastic polymer which is capable of injection molding.

The receptacle portion of the litter box is comprised of four sides and a base with the top open for the insertion and removal of materials therein. Along with the basic configuration of the litter box receptacle, inserts for the support of cups, dividers for audio tape storage and the like modifications of the receptacle are well within the scope of the invention.

Normally the litter box is mounted in the front portion of the automobile interior upon the transmission and driveshaft tunnel and optionally in the rear portion of the automobile upon the tunnel. Because the tunnel is generally curved (either circular or elliptical) the base of the litter box is also preferably correspondingly curved to enhance stability in mounting the box. However, it is unnecessary for the curvature of the base to exactly match the curvature of the tunnel, and the base may even be flat.

At each end of the base two arcuate arms are mounted thereto by prongs preferably integrally formed with the arms which engage bearing surfaces in the base of the receptacle. Thus, the arms are rotatably mounted within a limited arcuate travel to opposing ends of the base.

The arcuate arms mounted at opposing ends of the box are preferably identical in construction and formed by injection molding independently of the box. The thickness of the arms is of importance in order to provide adequate spring-like compressive force which will be hereinafter described.

The spring-like compressive force is provided by the cooperating action of the arms and an extension preferably integrally formed with the receptacle. This extension is positioned at the approximate center of each side associated with the base mounting of each arm, thus limiting the upward travel of the arm. When the arms are pulled upwardly, the top portion thereof contacts the extension and flexes laterally axially because of the thickness of the arms in connection with their particular material of construction. The flexing force is borne by the prongs on the arms and bearings in the base and provides an opposite inwardly compressive force corresponding to the upward applied force.

Preferably the extension is inflexible and sufficiently short so that the maximum forces applied thereto are generally perpendicular to the arm, thus obviating problems of breakage of the extension.

In a preferred embodiment of the invention when the arms are rotationally placed as far inwardly as possible, their mounting surfaces engage the mounting surface of the base to provide for the minimum volume for storage and shipment.

Also, because most automobiles recently manufactured are provided with carpeting, a plurality of gripping teeth members are formed with the engaging surfaces of both the base and the arms. These teeth embed themselves in the carpeting and provide further vertical and horizontal stabilization to the mounted litter box.

In operation the arcuate arms of the litter box are pulled outwardly thereby flexing them laterally axially against the extension. The arms are then placed about the sides of the transmission tunnel with the base of the box resting thereon, and the outward pulling force is released and the arms, not completely relaxed, engage the tunnel thereby applying frictional compressive force to the tunnel.

The following drawings are illustrative of the invention.

DETAILED DESCRIPTION OF THE DRAWINGS

Figure 1:
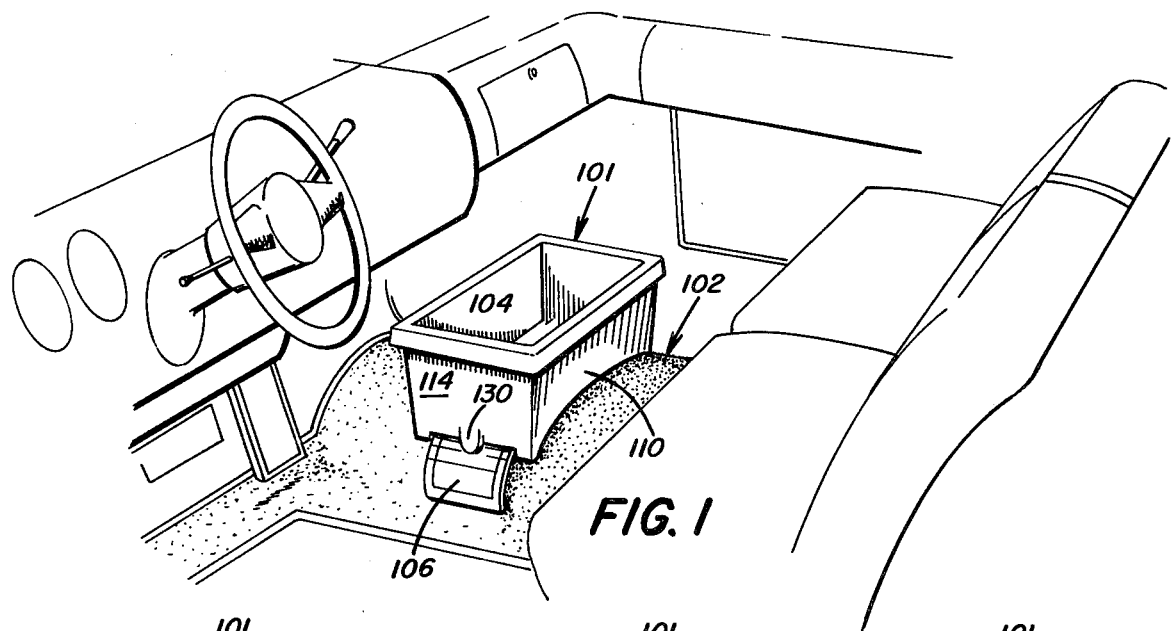
FIG. 1 is a perspective view of the litter box mounted in an automobile.

Referring now to the drawings in which like reference numerals refer to like parts. A litter box 101 is shown installed on the transmission and driveshaft tunnel 102 of an automobile. The litter box 101 is constructed of three individual components, the volume enclosure 104 open at one end thereof and arms 106 and 108; arms 106 and 108 are identical. Each part is formed by the injection molding of plastic material, therefore requiring only two molds, one to form the enclosed volume 104 and another to form the arms 106 and 108, since the arms are interchangeable.

Figure 2:
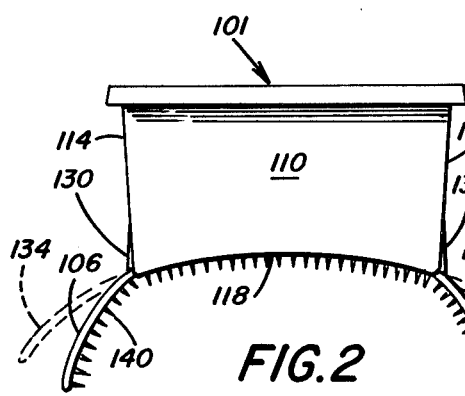
FIG. 2 is a side elevation showing the arms of the box in the flexed and unflexed position.
Figure 3:
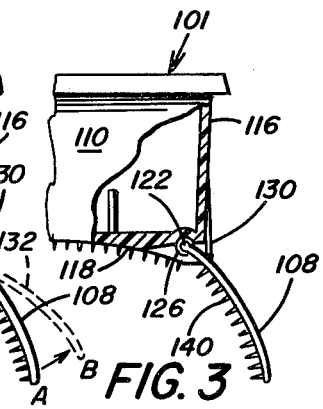
FIG. 3 is a side elevation, parts broken away, partially in section, of one end of the litter box.
Figure 4:
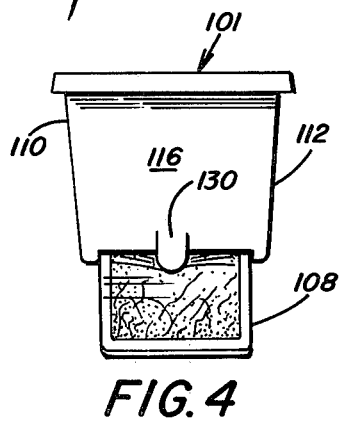
FIG. 4 is an end view of the litter box with one arm extended.
Figure 5:
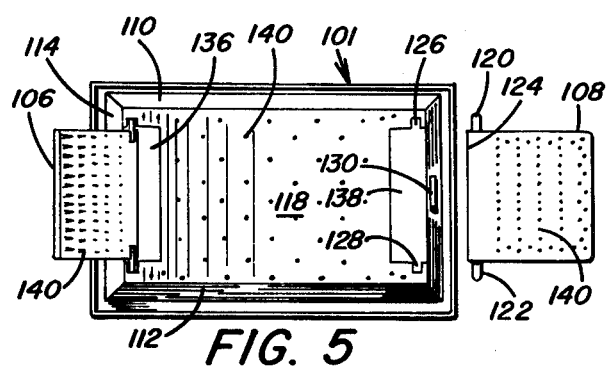
FIG. 5 is a bottom view of the litter box with one arm removed.
Figure 6:
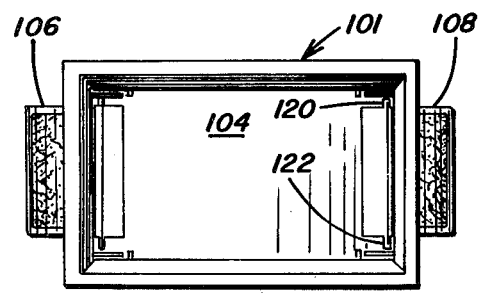
FIG. 6 is a top view of the litter box.

The volume enclosure 104 open at one end thereof is defined by four sides 110, 112, 114 and 116 and a base 118. The base 118 is generally curved and adapted to conform to the configuration of the transmission and driveshaft tunnel 102. Exact confirmation to the tunnel 102 is unnecessary because of the arrangement and function of the arms 106 and 108 previously described. Referring specifically to FIGS. 3, 4 and 5, the arm 108 has integrally formed therewith prongs 120 and 122 which are axially positioned along the edge 124 of arm 108. These prongs ride on bearing surfaces 126 and 128 integrally formed about the edge of base 118. Thus, arms 106 and 108 are rotationally mounted by the prongs 120 and 122 to the base by the bearing surfaces 126 and 128, which allow limited travel of the arms. The extensions 130 extend downwardly from each side 114 and 116 to engage the top portion and lateral center of the arms 106 and 108. This extension 130 is inflexible and when an arm as 108 is moved outwardly, the flexible nature of the arm acts in a spring-like manner applying pressure inwardly and toward the periphery of the transmission and driveshaft tunnel applying compressive force thereto. In FIG. 2, this spring-like action is illustrated with the arms in an unflexed position shown in normal fashion and the arms in flexed position shown in phantom at 132 and 134.

Figure 8:
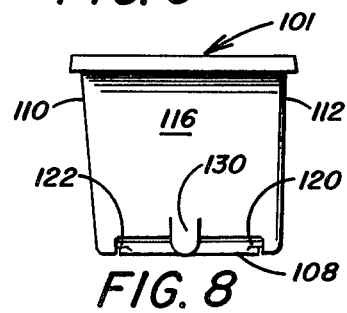
FIG. 8 is an end elevation of the litter box with the arms retracted.

Thus, in mounting the litter box 101 onto tunnel 102, the arms are flexed by travel from the A to B position and the box is placed upon the transmission tunnel as is shown in FIG. 1; the pressure is released and the arms grip the transmission tunnel at a position somewhere between positions A and B, thus gripping by compressive force and fixing the litter box in position. As can be readily seen by those skilled in the art, only one arm must have the spring-like action since a litter box having one arm rigidly fixed to the base and a second arm mounted as shown in the drawings may be mounted by frictional engagement. However, it is preferred that both arms provide the spring-like action for several reasons. The rotational mounting of the arms 106 and 108 provide a compact configuration as is shown in FIG. 8 for packing several of the litter boxes in a container for shipment and thus reduce the shipping volume. A second advantage is that only two parts are necessary in accordance with the embodiment shown, two arms of identical configuration and the enclosed volume section. Further, greater stability is obtained by the frictional compressive forces applied by both arms.

Figure 7:
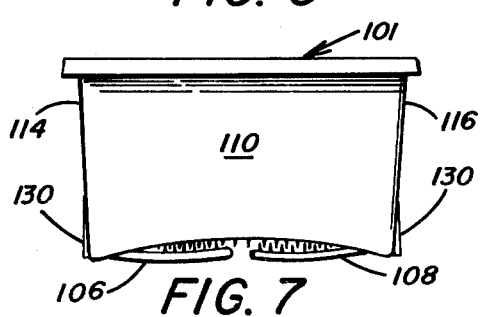
FIG. 7 is a side elevation of the litter box with the arms retracted.

As is further shown by FIGS. 5 and 7 an indentation 136 and 138 at each end of the base 118 is provided so that when the arms are retracted and placed under the base, the outer periphery of the arcuate arms provide two resting points for stacking and shipping the litter boxes.

In addition to the gripping force provided by the spring-like actuation of the arms 106 and 108, gripping teeth members 140 are integrally formed with the arms 106 and 108 and the base 118. These teeth are embedded in the carpet yarn and provide further stabilization to the litter box 101 when mounted on the transmission tunnel 102.

I claim:

1. In an automobile litter box including an enclosed volume open at one end which provides a receptacle with a base which is adapted to rest upon the outer periphery of an automobile transmission and driveshaft tunnel, the improvement comprising:
a pair of arcuate arms rotatably mounted at opposing ends of said base by hinge means associated with each arm and a corresponding end of said base; said hinge means being comprised of a pair of prongs for each arm extending axially outwardly, and bearing means within each opposing end of said base for receiving said prongs; means for applying spring-like compressive force to at least one of said arms and thereby providing the compressive frictional engagement of said arms with the outer periphery of an automobile transmission and driveshaft tunnel; said means for applying spring-like compressive force being comprised of said arms being resiliently flexible, and an extension integrally formed with each side corresponding to each base end which extends downwardly and removably engages said arm at the axial center thereof to flex said arm laterally when upward force is applied to said arm, said flexing, tending to force said arm downwardly.

2. The litter box of claim 1 wherein the maximum forces applied to the extension during flexing of the am is generally applied perpendicularly to said extension.

3. The liter box of either claim 1 or claim 2 including gripping teeth members integrally formed with said base and arms adapted to be embedded in carpeting on said tunnel.

* * * * *